United States Patent
Westervelt

(10) Patent No.: US 6,264,228 B1
(45) Date of Patent: Jul. 24, 2001

(54) HITCH ASSEMBLY FOR ACTIVATING A TOWED VEHICLE'S BRAKES

(75) Inventor: Neil Westervelt, Iola, KS (US)

(73) Assignee: Nite Shift Auto, Iola, KS (US)

( * ) Notice: Subject to any disclaimer, the term of this patent is extended or adjusted under 35 U.S.C. 154(b) by 0 days.

(21) Appl. No.: 09/257,380

(22) Filed: Feb. 25, 1999

(51) Int. Cl.$^7$ .................................................. B62D 53/06
(52) U.S. Cl. ...................... 280/428; 280/446.1; 280/486; 188/112 R
(58) Field of Search .................................. 280/428, 430, 280/432, 486, 487, 446.1; 188/3 R, 112 R, 142

(56) References Cited

U.S. PATENT DOCUMENTS

| | | | |
|---|---|---|---|
| 2,522,855 | * | 9/1950 | Brown .................................. 188/112 |
| 2,575,183 | | 11/1951 | Mettetal, Jr. . |
| 3,144,101 | * | 8/1964 | Hahn .................................... 188/112 |
| 3,318,422 | | 5/1967 | Frescura . |
| 3,881,577 | * | 5/1975 | Wherry et al. ..................... 188/112 R |
| 3,892,296 | * | 7/1975 | DePuydt et al. ................... 188/112 R |
| 4,746,138 | * | 5/1988 | James ..................................... 280/487 |
| 5,195,768 | | 3/1993 | Hendrix . |
| 5,246,243 | * | 9/1993 | Carr ..................................... 280/428 |
| 5,762,167 | | 6/1998 | Hendrix . |

FOREIGN PATENT DOCUMENTS

| | | | | |
|---|---|---|---|---|
| 97205 | * | 10/1939 | (DE) .................................... 188/112 |
| 1508307 | * | 4/1902 | (FR) .................................... 188/112 |
| 1115222 | * | 4/1956 | (FR) .................................... 188/112 |

OTHER PUBLICATIONS

"When It Comes to Towing Safety, Put Your Foot Down", Automatic Equipment Mfg. Co., Sep. 1997 (1 Sheet).
"AutoStop: Tow Bar Braking System", CBX (1 Sheet), undated.

* cited by examiner

Primary Examiner—Daniel G. DePumpo
(74) Attorney, Agent, or Firm—Dowell & Dowell, P.C.

(57) ABSTRACT

A hitch ball assembly which includes a housing adapted to be movably mounted within a conventional hitch receiver associated with a towing vehicle wherein a shock absorber is mounted within the housing and which is connected to a pivotable lever having a free end extending outwardly of the housing. A brake cable is connected between the free end of the lever and a brake pedal of a towed vehicle such that the brake pedal is applied by the cable whenever forces are developed by the towed vehicle in the direction of the towing vehicle.

13 Claims, 2 Drawing Sheets

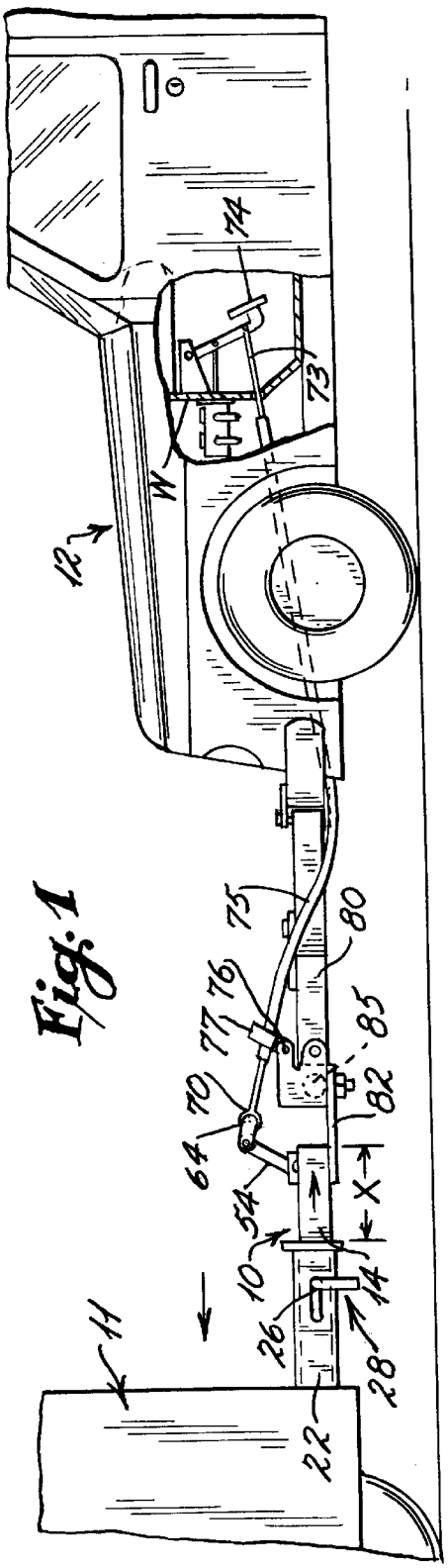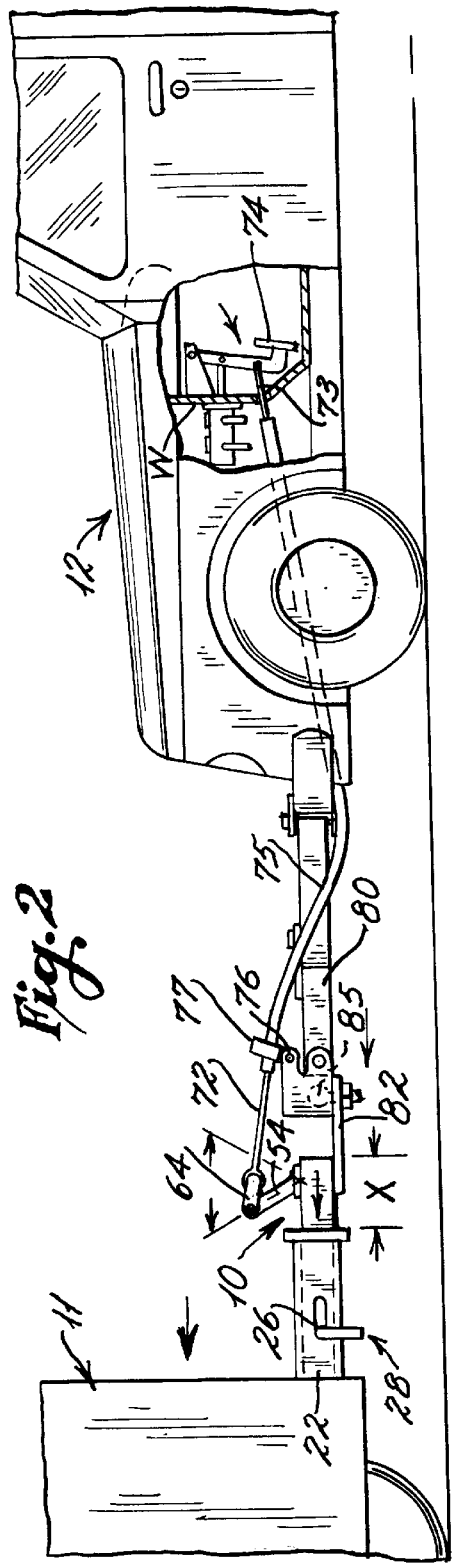

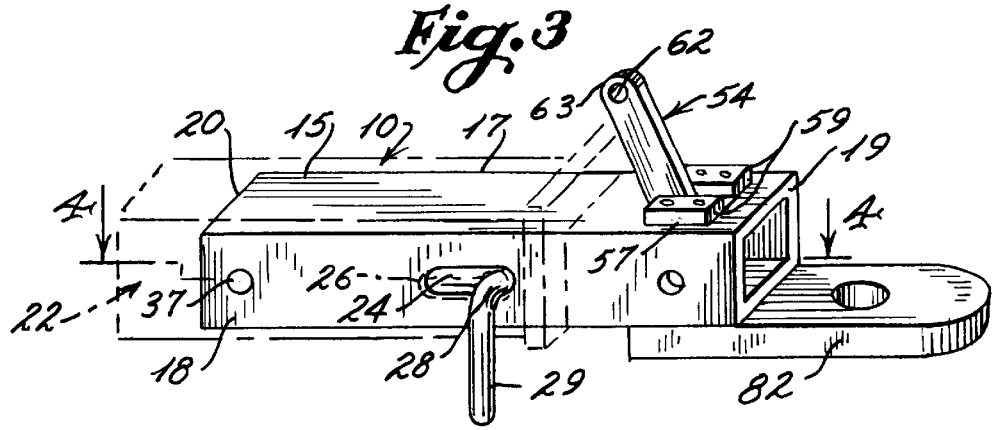
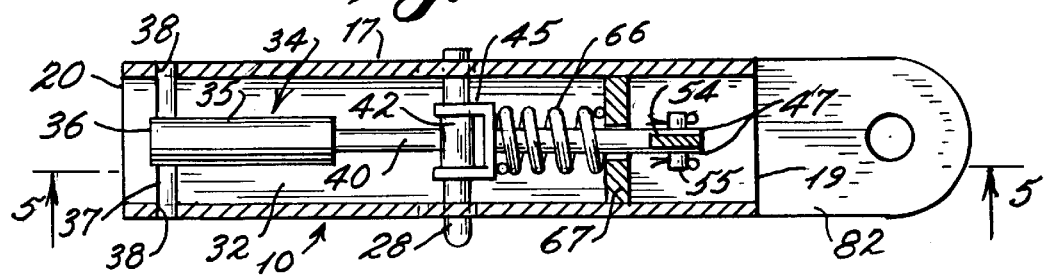
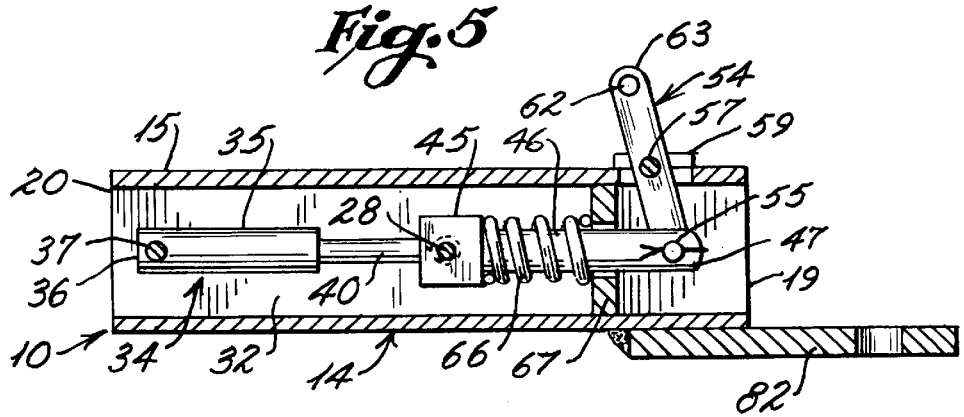

HITCH ASSEMBLY FOR ACTIVATING A TOWED VEHICLE'S BRAKES

BACKGROUND OF THE INVENTION

The present invention is generally directed to systems for automatically applying the brakes of a vehicle being towed in response to forces developed between the towed vehicle and a towing vehicle and, more particularly, to a braking system which is incorporated with a hitch ball assembly adapted to be installed within a conventional receiver extending from a towing vehicle and wherein the hitch ball assembly is moveable relative to the receiver to thereby apply tension to a cable connected between the hitch ball assembly and a brake pedal of the towed vehicle.

HISTORY OF THE RELATED ART

Whenever a vehicle is being towed, the towing vehicle must absorb the momentum of the towed vehicle during braking. This additional force which must be absorbed by the brake system of the towing vehicle not only greatly reduces the life span of the braking system of the towing vehicle but also has an immediate effect on the safety and control of both the towing vehicle and the towed vehicle as the effective braking distance is increased. Also, in emergency braking situations, the amount of force applied between the towed vehicle and the towing vehicle along the hitch tongue and the hitch ball assembly is such that the towing vehicle may tend to jack-knife relative to the towing vehicle thus resulting in a potentially hazardous situation.

The problems relating to the wear and tear on a vehicle's braking system are even greater in those situations where the towing vehicle is normally used in a towing capacity, such as when a mobile home is utilized to tow a personal automobile or other vehicle which is used when the mobile home is parked.

A number of systems have been developed for automatically activating the brakes of a towed vehicle in response to changes in velocity between the towed vehicle and the towing vehicle such when the brakes of the towing vehicle are applied or such as when the towed vehicle applies a force toward the towing vehicle when both vehicles are moving downhill. In a number of such automatic braking systems, specialized tow bars connect the hitch ball of the towing vehicle with a hitch mount secured to the towed vehicle. Such specialized tow bars include spring or other tensioning devices for developing a force along a cable which extends from the tow bar to the brake pedal of the towed vehicle, see for example U.S. Pat. No. 2,575,183 to Mettetal, Jr., U.S. Pat. No. 3,318,422 to Frescura and U.S. Pat. No. 5,762,167 to Hendrix. Unfortunately, such tow bar devices are rather complex and expensive. Also, such tow bars are not readily storable in conventional vehicles and are thus not utilized in many instances. Further, many of the tow bars which are currently in use are conventional tow bars which do not incorporate a braking feature.

To allow conventional tow bars to be used in automatic braking systems for a towed vehicles, U.S. Pat. No. 5,195,768 to Hendrix discloses a hitch ball assembly designed to be mounted to a conventional receiver with the hitch ball assembly being connected to a conventional tow bar. The hitch ball assembly includes a mechanism for applying tension to a spring and cable which are connected to the brake pedal of the towed vehicle. The patent includes a pulley system mounted within the hitch ball assembly and about which the cable is wrapped such that tension is applied to the cable by the relative movement of the pulley assembly within the hitch ball assembly in response to a force applied by the towed vehicle toward the towing vehicle. The hitch ball brake assembly further includes a shock absorber which is connected to the pulley means to thereby moderate the movement of the pulley system relative to the housing of the hitch ball assembly.

With the system disclosed in the hitch ball braking assembly of the patent to Hendrix, the braking cable must be wrapped about the pulley assembly and must move relative to the pulley during use. Under such conditions, it is not possible to readily inspect the condition of the cable at the point of engagement with the pulley system and any misplacement of the cable or wear and tear on the cable is not readily discernable to the vehicle operator.

SUMMARY OF THE INVENTION

This invention is directed to a hitch ball vehicle brake assembly which includes a housing which is adapted to be received within a conventional hitch receiver which is fixedly mounted to a vehicle for purposes of towing another vehicle. The housing includes upper, lower and opposite side walls which define an interior chamber with a pair of aligned slots being provided in the opposite side walls for purposes of receiving a mounting pin by way of which the housing is connected to the conventional receiver in such a manner that the housing may slide relative to the connecting pin within the receiver. Mounted within the chamber is a shock absorber including a cylinder portion for retaining a fluid or other shock absorbing resistance member and a forwardly extending ram. The cylinder is fixed to the housing so as to move with the housing relative to the receiver. The forward portion of the ram is connected to a yoke or base of a plunger which extends toward the rear of the housing and which plunger is pivotally connected at its outer end to a brake lever which has a free end which extends through an opening in the top wall of the housing and is pivoted relative to the opening in the top wall of the housing. A spring or other resilient device is mounted within the housing so as to normally urge the brake lever toward a non-braking position rearwardly of the housing. The ram and base of the plunger are engaged by the mounting pin so as to be retained stationary relative to the receiver. A hitch ball mounting plate is mounted to the lower wall of the housing and extends forwardly thereof for purposes of receiving a conventional hitch ball.

To connect the brake lever to a brake pedal of a towed vehicle, an opening is provided in the free end of the lever to which one end of a brake cable is connected. The cable extends from the lever to a remote end which is adapted to extend through a small opening in the fire wall of the towed vehicle after which the end is secured to the brake pedal such that when the lever is pivoted to apply tension to the brake cable, the cable will apply the brake in a conventional manner to thereby activate the braking system of the towed vehicle.

It is a primary object of the present invention to provide an automatic braking system for applying the brakes of a towed vehicle when a force is applied by the towed vehicle relative to the towing vehicle to thereby reduce the wear and tear on the braking system of the towing vehicle as well as to provide for increased safety by decreasing the braking distance when the towing vehicle has applied its brakes and to also prevent over-heating of the towing vehicle braking system.

It is also an object of the invention to provide an automatic braking system for connecting a towed vehicle to a towing vehicle where physical control of the brake pedal of the towed vehicle is achieved by a spring loaded brake lever which is moved to apply or release brake pressure against the resistance of a shock absorber fixedly mounted within a housing slidably moveable within a conventional hitch receiver of the towing vehicle.

It is yet another object of the present invention to provide an automatic braking system associated with a hitch ball mount assembly which is adapted to be used between a conventional hitch receiver associated with a towing vehicle and a conventional tow bar for towing a towed vehicle and wherein the size of the hitch ball and brake assembly allows the assembly to be easily and compactly stored when not in use.

It is yet a further object of the present invention to provide an automatic braking system for use between towing and towed vehicles wherein a shock absorber member is mounted within a hitch ball assembly to provide a damper between a hitch ball and a brake activating lever associated with the hitch ball assembly associated with the braking system so that any forces developed between the towing and towed vehicle are absorbed by the shock absorber.

It is a further object of the present invention to provide an automatic braking system associated with a hitch ball assembly mounted to a towing vehicle wherein a brake cable extending from the braking system to the brake pedal of the towed vehicle may be easily and readily inspected to ensure proper operational safety.

BRIEF DESCRIPTION OF THE DRAWINGS

A better understanding of the invention will be had by reference to the attached drawings wherein;

FIG. 1 is a side illustrational view of the present invention shown in use between a towing vehicle and a towed vehicle;

FIG. 2 is a side illustrational view similar to FIG. 1 except showing the relative movement of the present invention with respect to a receiver extending from a towing vehicle;

FIG. 3 is a top perspective view of the hitch ball assembly and braking apparatus of the present invention;

FIG. 4 is a cross sectional view taken along line 4—4 of FIG. 3; and

FIG. 5 is a cross sectional view taken along line 5—5 of FIG. 4.

DESCRIPTION OF THE PREFERRED EMBODIMENT

With continued reference to the drawings, the hitch ball and brake assembly 10 of the present invention is shown as being mounted between a towing vehicle 11 and a towed vehicle 12. The assembly includes a housing 14 having an upper wall 15, lower wall 16 and opposite side walls 17 and 18 and front and rear ends 20 and 19. The housing 14 is of a size to be slidingly received within a conventional receiver 22 which is welded or otherwise secured to the towing vehicle 11. To secure the housing within the receiver, a pair of aligned slots 24 are provided through the opposite side walls 17 and 18 of the housing. The receiver includes aligned openings 26 therein through which a locking pin 28 is selectively received. The locking pin includes a handle portion 29 and an opening (not shown) spaced from the handle portion for receiving a cotter pin (not shown) which secures the pin to the locking receiver. The locking pin is inserted through the aligned openings 26 in the receiver and through the slots 24 in the housing. Because of the slots 24, the housing 14 is slidable moveable a limited distance within the receiver.

The walls of the housing define an inner chamber 32 in which a shock absorber mechanism 34 is mounted. The shock absorber mechanism includes a cylinder portion 35 which normally retains a shock absorbing mechanism, which may be a fluid assisted mechanism, and which is of conventional design. The cylinder 35 is mounted to a sleeve 36 which is hollow so as to receive a locking pin 37 therethrough which locking pin extends through aligned openings 38 through the side walls 17 and 18 of the housing adjacent the rear end 20 thereof. The shock absorber mechanism also includes and extension or piston rod 40 which is relatively moveable with respect to the cylinder 35 as will be described. The outer end of the piston rod includes a hollow sleeve 42 which is designed to receive the locking pin 28 therethrough such that the locking pin 28 physically retains the sleeve 42 and thus the piston rod 40 in a fixed position relative to the receiver when the locking pin is in place. Thus, relative movement between the cylinder 35 and rod 40 is caused by the cylinder moving with the housing.

The sleeve 42 associated with the piston rod 40 is also connected to a "U"-shaped yoke or base 45 of a forwardly extending plunger. The yoke 45 includes a pair of aligned openings which receive the locking pin 28 therethrough such that the yoke, and thus the plunger is fixedly mounted relative to the receiver when the assembly is in use. The forward end 47 of the plunger is bifurcated and includes aligned openings. A brake actuation lever 54 is mounted to the forward end 47 of the plunger such as by a locking pin 55 which extends within the aligned openings and a lower opening associated with the lever 54. The brake lever is pivotable about a central support pin 57 which is mounted along the upper wall 15 of the housing 14 by a pair of blocks or holders 58 and 59 each of which has a central cylindrical recess therein of a size to receive the pivot pin 57. The pivot pin extends through a central opening in the brake lever 54. The brake lever is also provided with an opening 62 in the outer or free end 63 thereof for purposes of securing a U-shaped mounting strap 64, see FIGS. 1 and 2, thereto utilizing a locking pin which is secured in place by a fastener such as a cotter pin. The strap is designed to receive one end 70 of a cable 72 which is connected thereto. The opposite end of the cable 73 is connected about the brake pedal 74 of the towed vehicle utilizing an appropriate locking mechanism. In order to connect the end 73 of the cable to the brake pedal, a small opening is provided through the fire wall "W" of the vehicle 12. To protect the cable from the elements, the cable may extend through a protective sleeve 75 which is attached at 76 to a guide 77 provided on a tow bar 80, as shown in FIGS. 1 and 2.

With particular reference to FIGS. 4 and 5, constant force is provided within the housing normally urging the brake lever toward a relaxed or non-braking position as shown in FIG. 1. The force may be applied utilizing a spring 66 which is mounted about the plunger 46 and which includes one end which abuts a bearing or bulk head 67 which may be formed as a wall having an opening therein through which the plunger extends. The bulk head 67 may also be provided by flange members which are welded or otherwise secured to the inner walls of the housing and which extend inwardly thereof in spaced relationship with respect to one another, but which provide a surface against which the spring is seated. The opposite end of the spring engages the "U"-shaped yoke 45 of the plunger 46.

To connect the tow bar 80 to the hitch ball brake assembly, the assembly includes a hitch ball support plate 82 which is welded to the bottom of the housing and extends rearwardly thereof and which includes an opening to which a hitch ball 85 is removably mounted.

In use of the hitch ball brake assembly 10 of the present invention, the housing is inserted within the receiver 22 secured to the towing vehicle 11 and the locking pin 28 is inserted through the slots associated with the housing 14, the openings of the yoke 45 of the plunger 46 and the sleeve 42 mounted to the piston rod 40 of the shock absorber. When initially installed, the housing will be positioned such that the locking pin 28 is situated near the front of the elongated slots 24 in the side walls 15 and 16 of the housing. In this position, the brake lever 54 will be pivoted to the relaxed non-braking position extending toward the towed vehicle, as shown in FIG. 1. The spring 66 will tend to maintain this position. Thereafter, the hitch bar 80 is mounted to the hitch ball 85 and the cable is connected to the mounting strap 64 associated with the brake lever with the opposite end thereof being extended through the opening in the fire wall of the towed vehicle to the brake pedal 74. The ends of the cables are secured by conventional fasteners after proper tension is applied such that the brake is not applied when the brake lever 54 is in the position shown in FIG. 1. However, any pivotable movement of the brake lever 54 in a forward motion toward the towing vehicle 11 will apply increasing brake pressure through the cable to the brake pedal, as shown in FIG. 2.

When in motion, should the towing vehicle apply its brakes, there will be a relative force applied by the towed vehicle to the hitch ball assembly in the direction of the towing vehicle. As this occurs, the hitch ball housing will move toward the towing vehicle within the receiver such that the housing moves relative to the fixed locking pin 28. In FIG. 1, the housing 14 is shown as extending outwardly of the receiver 22 at a distance equal to "X". In FIG. 2, the housing has been forced into the receiver so that it only extends outwardly at a distance "X'" which is less than "X". During this motion, the shock absorber cylinder 35 will be pushed toward the rod 40 which is retained in fixed relationship with respect to the receiver because of the locking pin 28. Also, during this motion the plunger 45 will retain the lower end of the brake lever 54 in position. Once sufficient force is applied to move the housing a predetermined distance, the brake lever 54 will pivot about pin 57 and urge the brake lever forwardly towards the end 20 of the housing thus applying tension to the cable 72 and also thus applying pressure to the brake pedal of the towed vehicle. The braking movement of the brake lever toward the end of the housing is resisted by the spring 66 such that the spring will function to normally urge the brake lever to the relaxed or non-braking position pivoted away from the front end 20 of the housing. This is important in that it will require more pressure by the towed vehicle to apply the brakes of the towed vehicle. This will eliminate problems associated with brake applications on steep inclines, such as when the vehicles are moving down hill and will eliminate brake damage to the towed vehicle. Thus, when there is a forward motion of the towed vehicle relative to the towing vehicle, after a predetermined force is encountered, the brake lever will be moved to activate the brake of the towed vehicle. This force will be damped by the shock absorber and also resisted by the spring and when this force is terminated, the shock absorber and spring will move the housing to the position shown in FIG. 1.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A hitch ball assembly and braking apparatus for use in connecting a hitch assembly receiver mounted to a towing vehicle to a tow bar mechanism associated with a towed vehicle for automatically applying brakes of the towed vehicle by manipulation of a brake pedal associated with the towed vehicle whenever a predetermined force is applied by the towed vehicle in a direction of the towing vehicle, the hitch ball assembly and braking apparatus comprising; a housing of a size to be slidably receivable within the receiver, means for securing said housing within the receiver so that said housing is slidable therein, a shock absorber means mounted within said housing, a brake lever pivotally mounted relative to said housing and having a first end mounted within said housing and a second end extending outwardly thereof, means for connecting said shock absorber means to said first end of said brake lever, a cable means adapted to attach said second end of said brake lever to the brake pedal of the towed vehicle, and means for mounting a hitch ball to said housing and adapted to receive the tow bar mechanism associated with the towed vehicle.

2. The hitch ball assembly and braking apparatus of claim 1 in which said means for connecting said housing within the receiver includes a pair of aligned slots formed in opposite side walls of said housing, and a locking pin member adapted to extend through aligned openings in the receiver and through said aligned slots in said housing.

3. The hitch ball assembly and braking apparatus of claim 2 in which said shock absorber means includes a cylinder, means for mounting said cylinder within said housing, a piston rod extending from said cylinder, means for connecting said piston rod to said locking pin member extending through said slots in said side walls of said housing.

4. The hitch ball assembly and braking apparatus of claim 3 in which said means for connecting said shock absorber to said first end of said brake lever includes a pair of link elements mounted within said housing and having a first end connected to said locking pin member and second end pivotally connected to said first end of said brake lever whereby said piston rod and said link members are generally fixedly secured to the receiver when the assembly is mounted thereto.

5. The hitch ball assembly and braking apparatus of claim 4 including means for pivotally connecting said braking lever to said housing such that as said housing moves relative to said link element said brake lever is pivoted relative to said link element.

6. The hitch ball assembly and braking apparatus of claim 5 in which said means for pivotally connecting said brake lever to said housing includes a pivot pin mounted adjacent an upper wall of said housing, and means for securing said pivot pin to said upper wall of said housing.

7. The hitch ball assembly and braking apparatus of claim 6 including a receiver mounted to said cylinder of said shock absorber means, a pin means extendable through said receiver for securing said receiver to said opposite side walls of said housing.

8. The hitch ball assembly and braking apparatus of claim 3 including a receiver mounted to said cylinder of said shock absorber means, and pin means extendable through said receiver for securing said receiver to said opposite side walls of said housing.

9. A hitch ball assembly and braking apparatus for use in connecting a towing vehicle to a tow bar mechanism associated with a towed vehicle for automatically applying brakes of the towed vehicle by manipulation of a brake pedal associated with the towed vehicle whenever a predetermined force is applied by the towed vehicle in a direction of the towing vehicle, the hitch ball assembly and braking apparatus comprising; a housing of a size to be slidably receivable within a hitch assembly receiver, means for securing said housing within said receiver such that said housing is slidable with respect to said receiver, a shock absorber means mounted within said housing, a brake lever pivotally mounted relative to said housing and having a first end mounted within said housing and a second end extending outwardly thereof, means for connecting said shock absorber means to said first end of said brake lever, means adapted to attach said second end of said brake lever to a brake cable, and said means for connecting said housing within the receiver including a pair of aligned slots formed in opposite side walls of said housing and a locking pin member adapted to extend through aligned openings in said receiver and through said aligned slots in said housing.

10. The hitch ball assembly and braking apparatus of claim 9 in which said shock absorber means includes a cylinder, means for mounting said cylinder within said housing, a piston rod extending from said cylinder, means for connecting said piston rod to said locking pin member extending through said slots in said side walls of said housing.

11. The hitch ball assembly and braking apparatus of claim 10 in which said means for connecting said shock absorber to said first end of said brake lever includes a pair of link elements mounted within said housing and having a first end connected to said locking pin member and second end pivotally connected to said first end of said brake lever whereby said piston rod and said link members are generally fixed secured to said receiver when the assembly is mounted thereto and said housing is moveable relative to said receiver when mounted therein.

12. The hitch ball assembly of claim 11, including resilient means mounted within said housing for urging said brake lever so that said second end of said brake lever is pivoted toward a front of said housing.

13. The hitch ball assembly of claim 9, including resilient means mounted within said housing for urging said brake lever so that said second end of said brake lever is pivoted toward a front of said housing.

* * * * *